Aug. 10, 1965  E. I. CROYLE  3,199,149
MOLDING APPARATUS
Filed Jan. 18, 1963  4 Sheets-Sheet 1
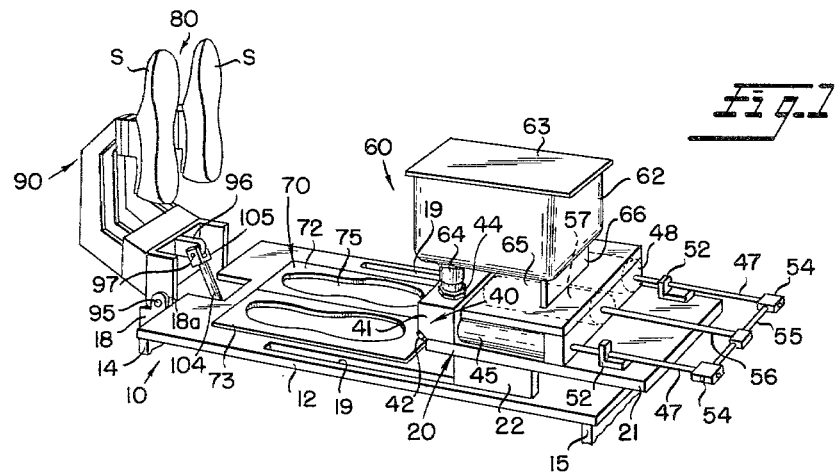
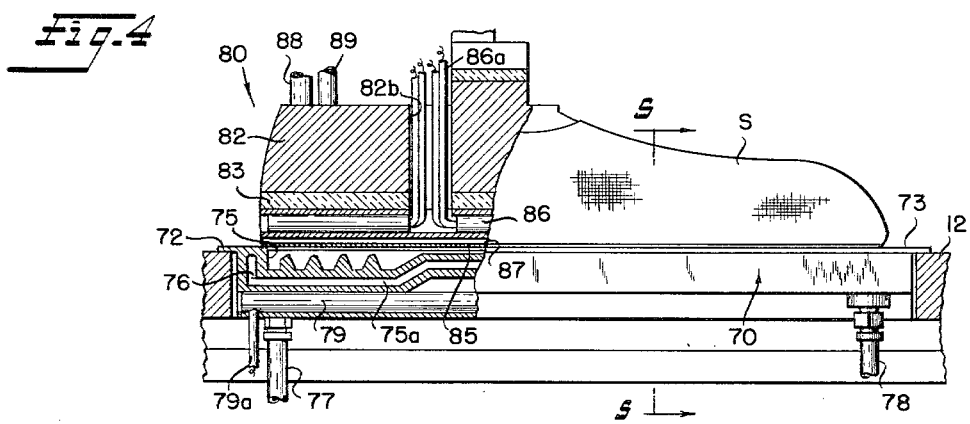
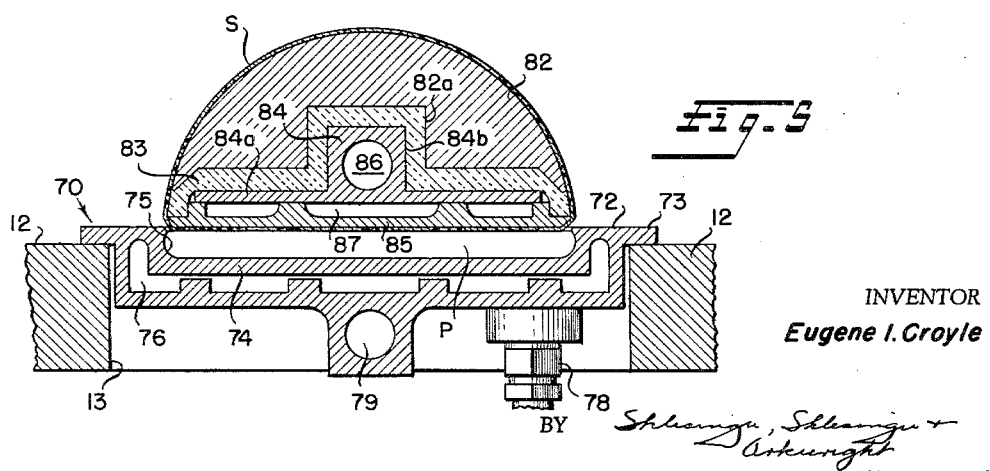
INVENTOR
*Eugene I. Croyle*
BY
ATTORNEYS

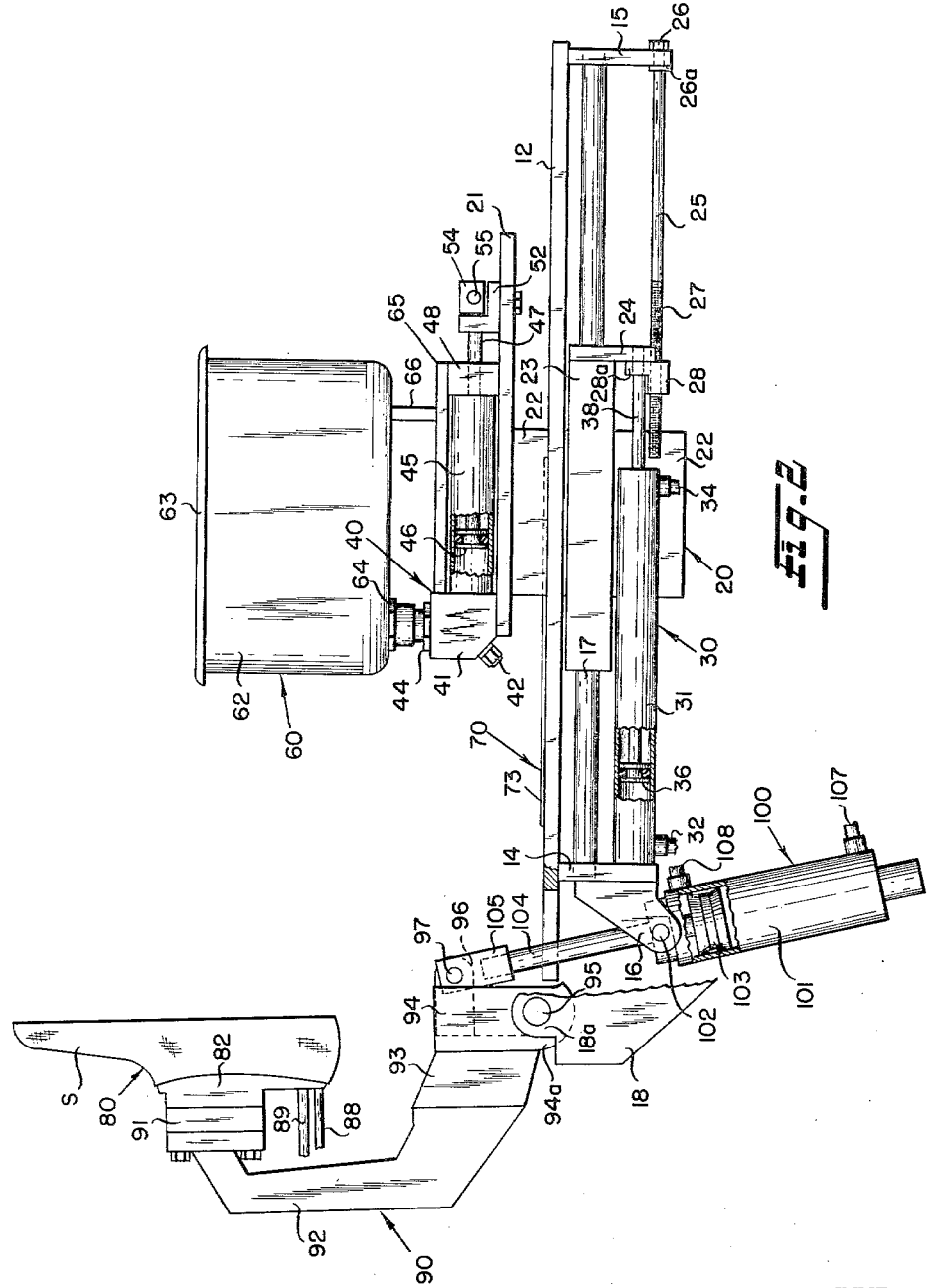

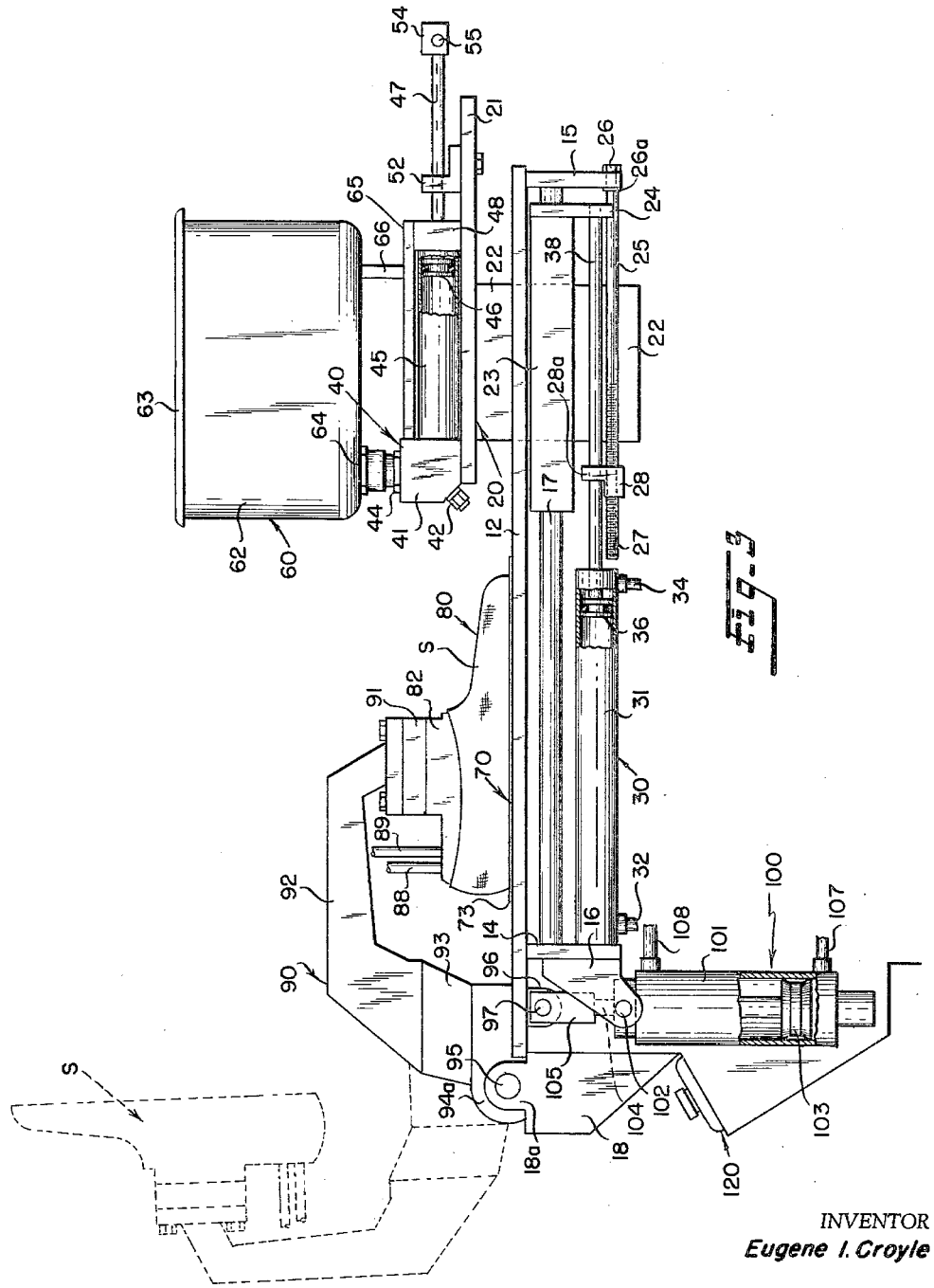

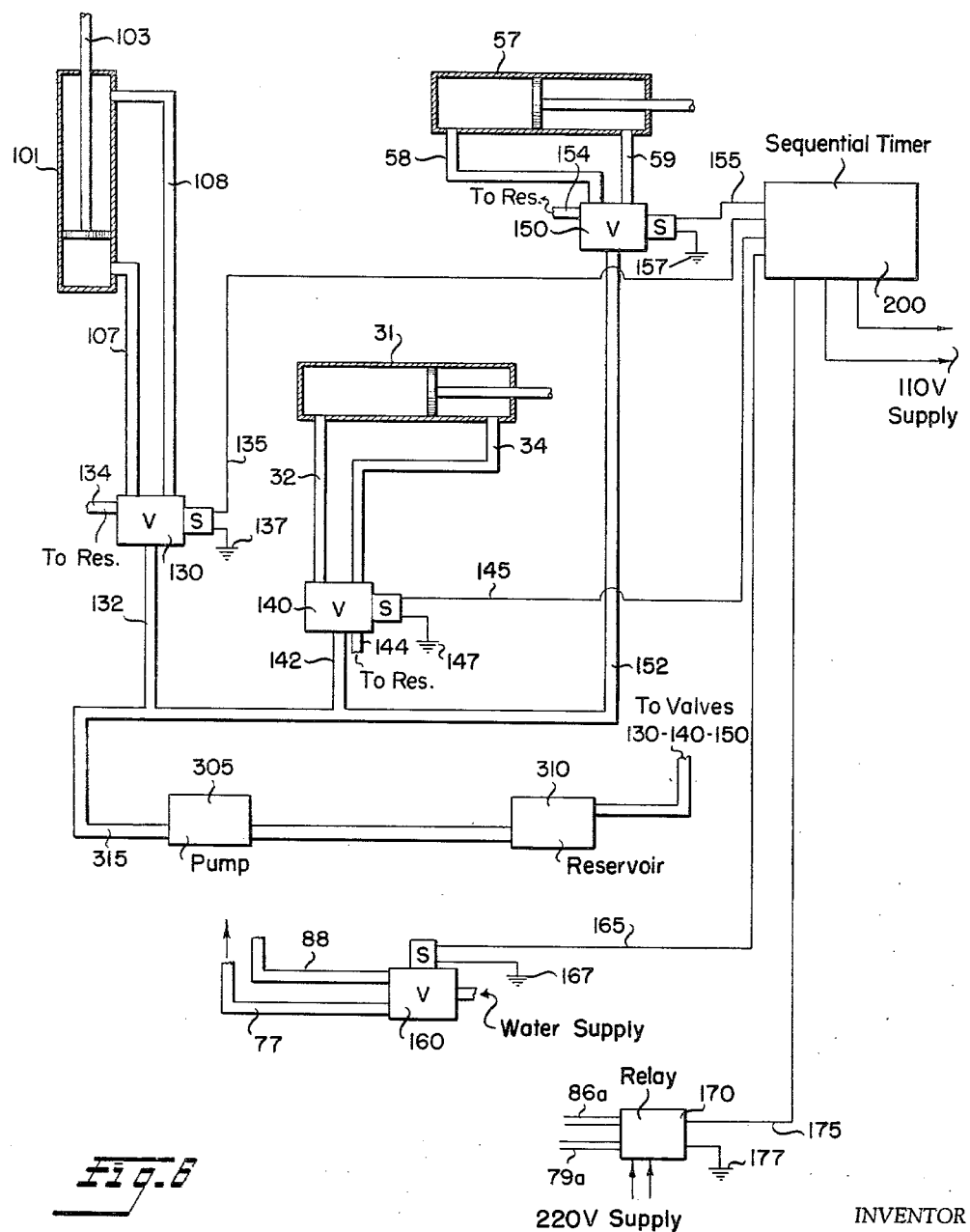

United States Patent Office 3,199,149
Patented Aug. 10, 1965

3,199,149
MOLDING APPARATUS
Eugene I. Croyle, San Angelo, Tex., assignor to American Research and Development Company, San Angelo, Tex., a corporation of Texas
Filed Jan. 18, 1963, Ser. No. 252,474
7 Claims. (Cl. 18—17)

This application is a continuation-in-part of my co-pending application entitled "Process and Apparatus for Making Footwear," having Serial No. 821,485, filed June 19, 1959, and now abandoned.

This invention relates to molding of compositions to fabric material and particularly to the molding of soles to a slipper or a shoe upper.

One of the persistent problems encountered in the foot wear industry has been the providing of cheap, durable, and flexible soles for foot wear. The cost of soling is extremely important in this highly competitive industry. Similarly, it is extremely important that the soling provided compare favorably from the standpoint of wearability. Accordingly, it is the purpose of this invention to provide a solution to the foregoing, although it is understood that the apparatus described herein is not limited to application in the foot wear industry.

It is an object of this invention to provide a simple, efficient manner of applying a thick composition of wear material to a fabric support.

A further object is to provide means for automatically applying such composition.

It is another object of this invention to increase output per man hour by providing single station apparatus readily usable by unskilled operators.

Another object of the invention is to provide apparatus for accomplishing the above wherein the necessary operations are automatically programmed.

A still further object of this invention is to provide apparatus in which production may be quickly switched from one type of foot wear to another.

Yet another purpose of this invention is to provide a simple liquid dispensing mechanism which places an accurately controlled amount of liquid composition into the mold.

A still further object of my invention is to provide apparatus in which all of the necessary steps in the molding process are regulated in a programmed cycle, including the controlled application of heat to the components.

Other objects and advantages of my invention reside in the details of construction, arrangement, combination of the various parts of my apparatus as hereinafter more fully set forth, as specifically pointed out in my claims, and illustrated in the accompanying drawing, in which:

FIGURE 1 is a general perspective view of my molding apparatus showing the last assembly in upright position, and the dispenser assembly in retracted position.

FIGURE 2 is a side elevational view with parts cut away, showing the lasts in upright position and the dispenser assembly in a fully forward dispensing position above the mold.

FIGURE 3 is a side elevational view with parts cut away, which shows the last assembly in position on the mold and the dispenser assembly in retracted position.

FIGURE 4 is a cut away side elevational view of the mold and last assemblies in engaged position.

FIGURE 5 is a sectional view taken on line 5—5 of FIGURE 4.

FIGURE 6 is a schematic showing an illustrative example of a control arrangement for my apparatus.

The principal assemblies, namely the mold, last, and dispenser assemblies are generally shown in the perspective illustration of FIGURE 1. It will be noted that the mold assembly 70 is set in the top plate 12 of the cabinet assembly 10; that the last assembly 80 is pivotally supported on the cabinet assembly; and that the dispenser assembly 40 and reservoir assembly 60 are both carried on the dispenser carrying assembly 20 for reciprocal movement over the open mold cavities 75.

Referring particularly to FIGURES 2 and 3 taken in conjunction with FIGURE 1, top plate 12 of the cabinet assembly 10 has two depending plates 14 and 15 extending downwardly therefrom which support the dispenser slide bar 17. The dispenser slide bar furnishes the direct support for the dispenser carrying assembly 20.

Dispenser carrying assembly 20 consists of a horizontally disposed dispenser carrying plate 21 which is supported from below by a vertically disposed strut member 22 which extends downwardly from the dispenser carrier plate 21 through the slot 19 in top plate 12 to directly engage bearing block 23 which is reciprocally mounted on the dispenser slide bar 17. Two such assemblies are provided to support dispenser carrier plate 21.

To control movement of the dispenser carrier assembly 20, a depending plate member 24 integral with the carrier block 23 is connected to a fluid power assembly 30 disposed parallel to dispenser slide bar 17 and fixedly connected to depending plate 14.

The power assembly 30 consists of a fluid cylinder 31 having fluid supply lines 32 and 34 and a piston 36. An elongated bearing block actuating rod 38 is directly connected with piston 36 at one end and plate member 24 at the other so that movement of piston 36 in cylinder 31 will also move plate member 24 and the dispenser carrier assembly 20.

An accurate and adjustable means of limiting the forward travel of the dispenser carrier assembly 20 is also provided. It consists of an elongated rod 25 rotatably supported in close, parallel proximity to actuating rod 38 and supporting a laterally adjustable stop nut 28 which will engage plate member 24 to prevent further forward movement thereof. Rod 25 extends through an opening in plate 15 of slightly larger diameter than that of the rod. Head 26 and washer 26a hold the rod in position, preventing lateral shifting thereof while allowing the rod to be rotated upon applying a wrench to head 26. Stop nut 28 threadedly engages threaded section 27 so that its lateral position may be adjusted upon rotation of rod 25. An upstanding sleeve section 28a of the stop nut is telescopically mounted on actuating rod 38 to permit free sliding movement of the parts. It will be noted that rotation of rod 25 will permit the position of stop nut 28 to be accurately adjusted for any desired position.

The dispenser assembly 40 is fixedly mounted on dispenser carrying plate 21, and in turn, supports the reservoir assembly 60.

Dispenser pump head 41 is mounted directly on plate 21 with the portion thereof which supports dispenser nozzle 47 extending forward and beyond the leading edge of plate 21, so that the nozzle 47 may protrude down over the forward edge of plate 21 enabling fluid solution to fall directly from the nozzle into the mold cavity 75.

Dispenser pump cylinder 45 is disposed longitudinally on plate 21 immediately behind the pump head 41 and in front of supporting block 43.

The details of the dispenser pump head construction are not shown. However, it consists of an interior cavity portion open at the rear and directly communicating with the forward open end of cylinder 45. The forward lower portion of the cavity directly connects with nozzle 42 which has a valve spring-biased in closed position and opens in response to pressure exerted by the composition within the cavity. A check valve generally indicated at 44 supplies the liquid composition to the cavity from the reservoir. It opens in response to the suction created when piston 46 is moved away from the cavity. When the piston travels toward the cavity, the liquid composition in the cylinder 45 ahead of piston 46 exerts a pressure on the two valves, closing valve 44 and forcing the valve in nozzle 42 open. The liquid composition then flows through the valve in the nozzle and drops down into the mold cavity.

Reservoir 62 is supported by means of the threaded connections between the tubular conduit 64 and check valve 44, as well as block member 66. Reservoir supporting plate 65 is supported on block 48. Reservoir 62 is open at the top and has a cover 63. The liquid composition flows through an opening directly above conduit 64, through conduit 64 to check valve 44 and then through the cavity in dispenser pump head 41 to fill the interior of cylinder 45.

The movement of piston 46 is controlled by extensible rod 47 which projects through the rear of cylinder 45 and through block member 48. Movement of this rod is controlled by the dispenser cylinder power assembly 50 having a conventional fluid power cylinder 57, shown in phantom in FIGURE 1, which is connected directly to elongated rod 56 to provide reciprocal movement thereof.

This fluid power cylinder is fixed on dispenser carrier plate 21 in direct line with rod 56 and parallel to dispenser pump cylinders 45. The piston of this power cylinder is directly connected to the end of rod 56 which projects through a block 48 so that movement of its piston will also move rod 56.

Power rod 56 is connected to a block and connecting rods 55 which are connected to stop blocks 54 and to which rods 47 are connected.

Adjustable stop bracket 52 through which elongated rod 47 passes, is bolted to carrier plate 21. FIGURE 2 shows the stop block 54 and bracket 52 in engagement and limiting the forward movement of piston 46. The desired length of travel of the piston is therefore determined by the distance between block 54 and bracket 52 when the piston 46 is in its rearmost position, as shown in FIGURE 3.

Referring to FIGURES 1, 4 and 5, mold assembly 30 is set within opening 13 of a cabinet top plate 12 and is held in proper position by appropraite fastening means which are not shown. The assembly may also be machine fitted into plate 12.

The mold assembly 70 has a flange portion 73 which extends over and rests upon the top surface of plate 12 immediately adjacent opening 13.

Mold cavity 75 is formed in the top surface 72 and has a thin body section 74 between the mold cavity and a fluid passage 76 to which cooling fluid is applied through connections 77 and 78. A cylindrical type electrical heater 79 having electrical connections 79a is inserted in the mold plate immediately below the fluid passage 76.

The last assembly 80 consists of an upper solid form 82 in the general shape of a shoe last. A cavity 82a of the general shape to accommodate a heating and cooling assembly is formed in the under side of the last member 82. An intermediate insulating layer 83 is disposed between form member 82 and a heater containing member 84. Member 84 has a bottom flat portion 84a and a central upstanding portion 84b in which cylindrical heaters 86 are disposed. Thin plate 85 rests on flat portion 84a of heater receiving member 84 and provides a flat bottom exterior surface for the last as well as forming an interior coolant passage 87 between its inside surface and the lower surface of member 84. Conduits 88 and 89 supply coolant to cavity passages 87.

Referring again to FIGURES 1 through 3, the pair of last assemblies 80 are supported on a pivotal assembly 90 which is supported on the cabinet assembly 10 through trunnion 18.

Each of the last assemblies 80 are bolted to arm members 92 through a last insulator block 91. The arm 92 is connected to an insulator block 93 supported on channel-shaped support 94.

Support member 94 has two extended portions 94a which are pivotally supported on trunnion 18 by a pin connection 95 to upstanding section 18a of the trunnion.

The last and last support assemblies are raised and lowered by means of a power cylinder 101 pivotally connected to plate 14 through trunnion 16.

The power cylinder assembly 100 consists of a cylinder 101 pivotally supported to trunnion 16 by means of pin 102, and having a movable piston 103. Fluid supply lines 107 and 108 are connected thereto.

The power cylinder is connected to the last support assembly 90 by means of an elongated rod member 104 which is directly connected to piston 103 at one end. The other end is connected to socket member 105 which is pivotally connected to the channel-shaped member 94 of the last support assembly 90 through pin 97 and depending lug 96.

Referring to FIGURE 6, which shows an illustrative control arrangement for my apparatus, a sequential timer 200 is used to program the operation of the various components of my device to produce a fully automated cycle.

Power cylinders 31, 57 and 101 are shown with solenoid control valves 130, 140 and 150 respectively, which direct the application of fluid pressure to the fluid supply lines of these cylinders.

Fluid pressure to these valves from pump 305 is supplied through conduit 315 which has branches 132, 142 and 152 connected to each of these solenoid valves. Return lines 134, 144, and 154 are connected to the reservoir 310 to complete a closed fluid supply circuit.

The valves are connected to the sequential timer through wires 135, 145, and 155, and the remaining leads of the solenoids grounded as shown at 137, 147, and 157.

Flow of coolant to the mold and last assemblies is controlled by solenoid valve 160 which is also connected to sequential timer 200 by means of wire 165 connected to the solenoid. The other lead of the solenoid is grounded as indicated at 167. Movement of the solenoid valve will control the supply of water to conduits 77 and 88 which lead respectively to chambers 76 and 87 of the mold and last assemblies respectively.

The application of heat to the mold and last assemblies is controlled through sequential timer 200 by a relay 170 connected to the timer through wire 175. Operation of this relay controls the application of a 220 volt supply current to the mold and last heater leads 79A and 86A respectively. A rheostat for each heater is located on panel 120 and connected in each electrical line between the heater and relay 170 to permit temperature adjustments. Alternatively an automatic and adjustable repeat cycle current interrupter may be used. A thermostat may also be used.

The sequential timer 200 is the conventional cam operated type, in which a plurality of cams are rotated on a shaft by a small A.-C. motor, and the rotation of the cams open and close a switch in contact with the cam surface, one end of which is connected to the out-going leads and the other side of the switch connected to the high voltage lead of the 110 volt supply.

Before describing the operation of this machine it should be understood that the liquid composition referred to herein is a poly-vinyl chloride plastisol composition.

The operation of this machine is as follows:

The cycle begins with the machine in position as shown in FIGURE 2 with the last assembly 80 in fully raised position, and the dispenser assembly 40 in forward position over the mold cavities. The mold cavities at this time contain the dispensed composition, and the two lasts each have an upper ready for soling placed thereon.

A start button located on control panel 120 is pushed to supply current to the sequential timer 200 to start the cycle and begin the first stage. The mold heater circuits are energized by the activation of relay 170, and the dispenser carriage assembly 20 is retracted to start position by the application of fluid pressure to cylinder 31 through line 32 which is connected to fluid supply line 142 by activation of solenoid 140. The sequential timer 200 activates this solenoid through lead 145.

Simultaneously the dispenser pump cylinders 45 are recharged with composition by moving pistons 46 rearwardly and away from dispenser pump head 41. This movement is controlled by the sequential timer 200 which supplies power through wire 155 to the solenoid valve so that conduit 58 of the dispenser power cylinder 57 is connected to conduit 152, to force elongated rod 56 rearwardly.

At the same time solenoid valve 130 is activated by the sequential timer to connect conduit 108 of power cylinder 101 to the fluid supply conduit 132. The lasts are moved from the vertical position to approximately ¼ inch to ⅜ of an inch of full closure with the mold cavities surface. This position may be referred to as the "First Stage Last" position.

The above mentioned movements comprise the first stage of the cycle and are completed in from one to slightly over two minutes.

The first stage begins with the mold temperature stabilized at approximately the meliting temperature of the expanding agent used in the liquid plastisol composition, approximately 210° to 220° F. The liquid pastisol at room temperature is poured into the molds. Slight expansion occurs immediately on the bottom, or tread surface and around the edge or welt area of the sole. The core and top surface of the plastisol composition remain fluid and non-expanded. During this stage the mold cavity temperature rises to 225–230° F., slightly below the gel range (240°–260° F.) of the plastisol. The time lapse in this stage is important since the gel temperature range must not be reached.

Also the last and shoe upper temperature must be kept in the gel range of 240° to 260° F. This latter temperature is important since it determines the degree of "wetting" and adhesion of the plastic to the upper. If the temperature is too low there is excessive "wetting" which raises plastisol consumption and occasionally produces radical cell structures. Too high a temperature causes premature gelling with little "wetting" and consequent poor bond of the sole to upper.

The last then descends to full closure with the mold cavities and will remain in that position for approximately three minutes, to expand and cure the composition.

In this second stage the lasts descend to full closure with the mold cavities and the heat input automatically raises the mold temperature to above the gel range temperature of the plastisol so that at approximately five minutes from the start of the cycle a fusion or fluxing temperature will vary slightly depending upon the thickness of the sole being molded.

At approximately five minutes from the beginning of the cycle the mold heater circuits will be deenergized by the timer 200 through relay 170.

Simultaneously, sequential timer 200 will activate the solenoid valve 160 through line 165 to connect the water coolant supply to the fluid passages in the mold and last assemblies through conduits 77 and 88. The temperature of the coolant is adjusted so that the temperature of the mold components may be stabilized within ten degrees of the activating temperature of the expanding agent used in the composition, which may range from 160°–220° F.

At approximately six minutes from the start of the cycle the sequential timer deactivates solenoid valve 130 connecting fluid power supply line 132 to the last power cylinder 101, through line 107, effecting the raising of the last support assembly. The soled shoes are stripped from the mold as the last is raised. During the raising of the last, the sequential timer deactivates solenoid valve 140, connecting the fluid supply 142 to conduit 34 and simultaneously connecting conduit 32 to fluid return conduit 144. This moves piston 36 forward in turn moving the dispenser carriage assembly 20 and the dispenser assembly 40 forward and over the mold to a position as shown in FIGURE 2.

At the time that the dispenser assembly 40 reaches a point directly over the mold cavity 75, the sequential timer 200 cuts off power to solenoid valve 150, thereby connecting conduit 58 to reservoir conduit 154 and connecting fluid supply conduit 152 to cylinder supply conduit 59. This moves the piston cylinder and elongated rod 56 forward in turn in moving piston 46 forward to force the plastic composition out of nozzle 42 so that it falls directly into the mold cavity 75, to partially fill it, leaving some room for expansion of the composition under the heat applied thereto by the mold and last assemblies.

The position as illustrated in FIGURE 2 shows the apparatus in final position and ready for the start of a new cycle. It will be noted that the forward travel in the dispenser carriage assembly 20 is arrested by stop member 28 and that the forward travel of dispenser piston 46 is arrested by stop member 52. At the time this position is reached the sequential timer automatically resets itself to zero time in preparation for another cycle.

When the last assembly reaches the vertical position, the soled pair of footwear is removed from the last assembly, completing the operation. Another unsoled pair of footwear is then slipped over the two last assemblies and the start push button depressed to reactivate sequential timer 200.

The conversion of the plastisol to a formed, fused end-use product makes use of the controlled application of heat. Cooling is necessary for removal of the finished product from the mold. Some important factors which determine actual operating conditions and duration of the molding cycle are: plastisol formulation; heating characteristics of the mold in use; thickness, density, and shape of the end product; depth of plastisol in the mold (expansion factor). In general, the time of heating largely is determined by the thickness of the end-product desired. This is because of the insulating characteristics of expanded plastisol.

The top temperature is influenced by the size and mass of the end-use product. In thin section, such as slipper-sock soles, proper fusion of the resin may occur at 305° F., while 350° or more may be required to fuse sections up to one half inch thick. In either case the heat must be applied so as to melt the vinyl on the wear, or tread surface of the end product. The properly molded product has a sandwich appearance with the center being expanded and macro-porous and the outside surface being a thin skin of dense vinyl.

With regard to the compositions used with this process, set forth below are one general Formula I and two specific Formulae II, III of plastisols which have been found to be satisfactory as a mix in the process generally described above:

I

| Ingredients: | Parts by weight |
|---|---|
| Vinyl dispersion type resin | 100 |
| Plasticizer | 20–150 |
| Inert filler | 0–40 |
| Stabilizer | ½–5 |
| Blowing or expansion agent | 1–10 |

The following are specific examples of the general ingredients set forth in Formula I:

Vinyl dispersion type resin:

(1) Goodreich's Geon 121
(2) Monsanto's Opalon 410
(3) Bakelite's Oynv

Plasticizers:

(1) Dioctyl phthalate or (DOP)
(2) Di-isodecyl phthalate or (DIDP)
(3) HB 40 by Monsanto Chemical Co.
(4) Di-isodecyl adipate Inert filler:
  (1) Calcium carbonate
  (2) Silica
  (3) Barytes Stabilizers:
  (1) Barium, cadmium, zinc stabilizer system
  (2) Tin stabilizer system
  (3) Lead stabilizer system Blowing or expansion agent
  (1) Du Pont's BL 353
  (2) Du Pont's Unical ND
  (3) Celogen-AZ (trade name of Naugatuck Chemical Div. U.S. Rubber Co. Naugatuck, Connecticut)

Two specific examples of the compositions which have proved to be satisfactory are set forth below:

II

| Ingredients: | Parts by weight |
|---|---|
| Geon 121 | 100 |
| DOP | 60 |
| HB 40 | 25 |
| #10 Whiting (calcium carbonate) | 15 |
| BZ 51 [1] | 3 |
| C 7 [1] | 1 |
| Du Pont's BL 353 | 2 |

[1] Advance Solvents & Chemical Co.

III

| Ingredients: | Parts by weight |
|---|---|
| Geon 121 | 100 |
| Dicapryl phthalate | 30 |
| Di-isodecyl adipate | 30 |
| Arochlor 1254 (Monsanto Chemical Co.) | 15 |
| Silica flour | 40 |
| Tribasic lead carbonate | 5 |
| Celogen-AZ | 5 |

As a specific example of the preferred process, reference is made to Formula II. This composition, containing the chemical expansion or blowing agent, is placed into the cavities by the dispensing means.

The mold is heated, resulting in the plastisol mix becoming more fluid and flowing throughout the mold cavity. The application of heat to the plastisol mix after descent of the last the blowing agent expands at about 220° F. This expansion of the blowing or expansion agent by virtue of the decomposition thereof increases the volume of the charge of plastisol mix in the cavities to the extent that the cavities are now completely filled, and the adjacent portions of the uppers are impregnated with the plastisol mix. Any excess gases resulting from the decomposition of the expansion agent will leak out of the mold through the portions of the uppers clamped between the last and the mold cavity.

Heating is continued and at about 250° F., the plastisol mix becomes cheesy in viscosity. It should be noted at this point that the process may be modified to permit the plastisol mix to be expanded in the cheesy state if larger cells are desired in the sole structure. This will result in a thicker wall structure between the cells and the resulting product will be tougher when it is cured.

Referring still to the specific example in Formula II, heating of the plastisol mix is continued until fusion takes place between the resins and the plastisizers at about 350° F. The fused plastisol mix is then rapidly cooled by forcing coolant through the mold and last conduits. This generally requires only thirty seconds and the mold product can then be stripped from the mold.

The process described in detail above is carried out with substantial rapidity and can be completed in approximately six minutes due primarily to the rapid heating and cooling of the elastomer mix.

Most elastomeric material, may be employed in this process, for example, rubber latex (natural or synthetic), epoxy resins, polyester resins, polyurethane resins, and isocyanates. The process, as mentioned above, has been found to be particularly effective when plastisols of polyvinyl chloride are employed.

It is also anticipated that the process will be employed in making non-lasted footwear. It should also be understood that a selection of colors is available merely by injecting appropriate pigments into the plastisol mix.

In the conventional molding of elastomeric articles, particularly those fabricated from rubber, very high pressures are required, and this results in the use of extremely heavy presses, molds, and other apparatus necessary for carrying out the fabrication.

However, in the process described herein above, high pressures are not required. External pressures on the molding means are relatively negligible, while internal pressures resulting from the decomposition of the expanding agent are relatively low. Thus, it is possible to use molding means which are lighter in construction than the conventional mold and this, in turn, permits a more rapid process since the molds may be heated and cooled more quickly. Further, the lightness of the mold construction assures rapid heating of the mold by heating means provided for this purpose.

Although the prior disclosure illustrates the preferred process used, the ranges may vary somewhat depending on the composition used.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:
1. A molding apparatus for footwear comprising:
  (a) a support table;
  (b) an open cavity shoe sole mold fixedly supported in a substantially horizontal plane by said table;
  (c) a dispenser mounted on said table for reciprocable horizontal movement for dispensing a liquid plastisol at room temperature;
  (d) said dispenser being movable from a position adjacent and clear of said shoe mold along a line of travel over said mold extending substantially the length of said mold so that plastisol is deposited inside said mold as the dispenser moves thereover;
  (e) last support means pivotally mounted on said table on a horizontal axis which is disposed transverse to the length of said shoe mold;
  (f) a last mounted on said last support means and movable therewith so that it closes the mold in one position and is moved clear thereof in another position;
  (g) heating means in said last having a heat level control unit to maintain temperature at approximately the gel temperature of the plastisol;
  (h) heating means in said mold having a heat level control unit which maintains the initial temperature of the mold at slightly above the melting temperature of the expanding agent in the plastisol;
  (i) control means for operating said dispenser and said last support assemblies;
  (j) an overall heat control means connected to both of said heating means for governing operation thereof; and
  (k) programming means connected to said dispenser, said last support, and said overall heat control means for providing cyclic operation of said unit, whereby said dispenser and said last are successively moved into operative position over said mold, and applica- tion of heat to said mold and last assemblies is directly controlled.

2. The molding apparatus for footwear as set forth in claim 1, wherein:
 (a) a second matching shoe mold is supported on said table adjacent and aligned with said first-mentioned shoe mold to form a pair of matched shoe molds for a single pair of footwear; and
 (b) a second matching shoe last is mounted on said last support means and is movable therewith so that it closes said second matching mold in one position and moves clear thereof in another position, said movement being simultaneous with the movement of said first-mentioned last.

3. The molding apparatus for footwear as set forth in claim 1, wherein:
 (a) a fluid cooling system is connected to both said mold and said last;

4. The molding apparatus for footwear as set forth in claim 1, wherein:
 (a) a liquid plastisol reservoir is mounted on and moves with said dispenser;

5. The molding apparatus for footwear as set forth in claim 1, wherein:
 (a) hydraulic power means are connected to said dispenser and said last support assemblies to effect movement thereof.

6. The shoe molding apparatus, as set forth in claim 1, wherein:
 (a) said control means for operating said dispenser and last support assemblies, and said overall heat control means include electrically responsive elements; and
 (b) said programming means includes a sequential timer assembly which is electrically connected to each of said electrically responsive elements.

7. The shoe molding apparatus as set forth in claim 1, wherein:
 (a) said heating means are electrical heating elements; and
 (b) said heat level control units are rheostats.

References Cited by the Examiner

UNITED STATES PATENTS

| | | | |
|---|---|---|---|
| 2,361,938 | 11/44 | Gregg | 12—146 |
| 2,678,456 | 5/54 | Connell | 12—146 |
| 2,804,649 | 9/57 | Hupfield | 18—30 |
| 2,839,786 | 6/58 | Alesi | 18—16 |
| 2,878,523 | 3/59 | Hardy | 18—17 XR |
| 2,916,771 | 12/59 | Lang et al. | 18—17 XR |
| 2,937,405 | 5/60 | Berggren et al. | 18—17 XR |
| 2,972,777 | 2/61 | Ghignatti | 18—34 |
| 2,973,790 | 3/61 | Huetter | 18—17 XR |
| 2,994,920 | 8/61 | Patera | 18—30 |
| 3,002,230 | 10/61 | Stewart | 264—45 |
| 3,044,122 | 7/62 | Webb et al. | 18—17 XR |
| 3,051,995 | 9/62 | Ferrell et al. | |
| 3,058,152 | 10/62 | Eldred et al. | 18—17 |
| 3,067,467 | 12/62 | Yanush | 18—34 |
| 3,124,626 | 3/64 | Grahm et al. | 264—45 |
| 3,129,269 | 4/64 | Charvat | 264—45 |

J. SPENCER OVERHOLSER, *Primary Examiner.*

DAVID J. WILLIAMOWSKY, ARTHUR H. BRODMERKEL, MICHAEL V. BRINDISI, WILLIAM J. STEPHENSON, *Examiners.*